United States Patent [19]

Ledermann et al.

[11] Patent Number: 4,681,335
[45] Date of Patent: Jul. 21, 1987

[54] CENTER PIVOT HITCH ASSEMBLY

[75] Inventors: Donald L. Ledermann, Darien; Ronald L. Otten, Naperville, both of Ill.

[73] Assignee: J. I. Case Company, Racine, Wis.

[21] Appl. No.: 836,730

[22] Filed: Mar. 6, 1986

[51] Int. Cl.⁴ .................. A01B 59/042; B60D 1/00
[52] U.S. Cl. .................. 280/446 R; 172/328; 172/413; 280/401 R; 280/461 A; 280/490 A
[58] Field of Search .......... 280/400, 414.5, 446 A, 280/476 R, 490 A, 494, 456 A, 408, 446 R, 461 A, 405 R; 172/679, 680, 413, 443, 328, 779, 780; 111/77, 85, 52, 7

[56] References Cited

U.S. PATENT DOCUMENTS

| Re. 30,550 | 3/1981 | Reise | 280/446 B |
|---|---|---|---|
| 3,269,748 | 8/1966 | Mazery | 280/461 A |
| 3,608,645 | 9/1971 | Meiners | 111/7 |
| 4,133,552 | 1/1979 | Sheine | 280/446 B |
| 4,313,616 | 2/1982 | Howard | 280/446 B |
| 4,326,594 | 4/1982 | Oka | 172/413 |
| 4,408,777 | 10/1983 | Camick | 172/680 |
| 4,450,917 | 5/1984 | Hake | 172/328 |
| 4,500,105 | 2/1985 | Machnee | 280/408 |
| 4,523,771 | 6/1985 | Bender | 280/446 A |

Primary Examiner—John J. Love
Assistant Examiner—Mitchell J. Hill
Attorney, Agent, or Firm—Dressler, Goldsmith, Shore, Sutker & Milnamow, Ltd.

[57] ABSTRACT

A novel center pivot hitch assembly mechanism is disclosed. The mechanism of the present invention is preferably carried by a wheeled tool bar and a wheeled agricultural implement. The wheeled agricultural implement or cart is typically moved along a path by a tractor. The mechanism of the present invention pivotally connects the wheeled tool bar to the backside of the cart. The mechanism of the present invention comprises a center pivot hitch assembly and a stabilization assembly. The center pivot hitch assembly selectively allows the wheeled tool bar to pivot transversely and vertically in relation to the path along which the wheeled agricultural implement is being moved. The stabilization assembly includes hydraulic fluid actuator means for selectively maintaining tool bar disposition relative to the agricultural implement backside, when the wheeled tool bar is oriented substantially parallel to the backside of the wheeled agricultural implement. An additional feature of the present invention, which causes overhung load on the wheeled tool bar to be centered substantially along the axle of the wheeled agricultural implement when the tool bar is also disclosed.

3 Claims, 6 Drawing Figures

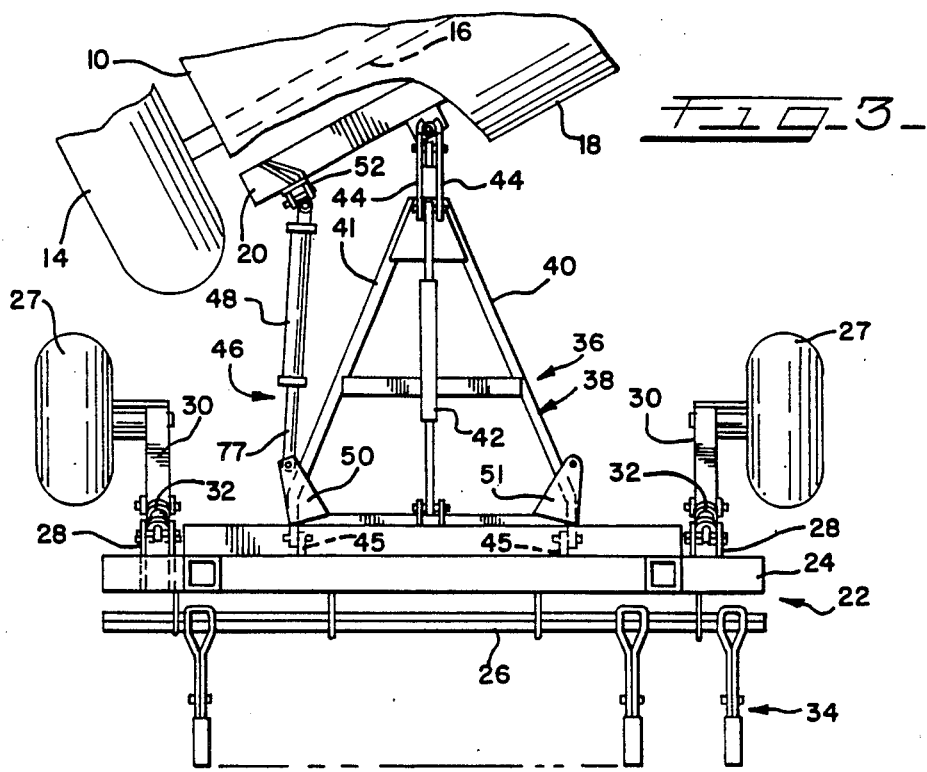
FIG_3_
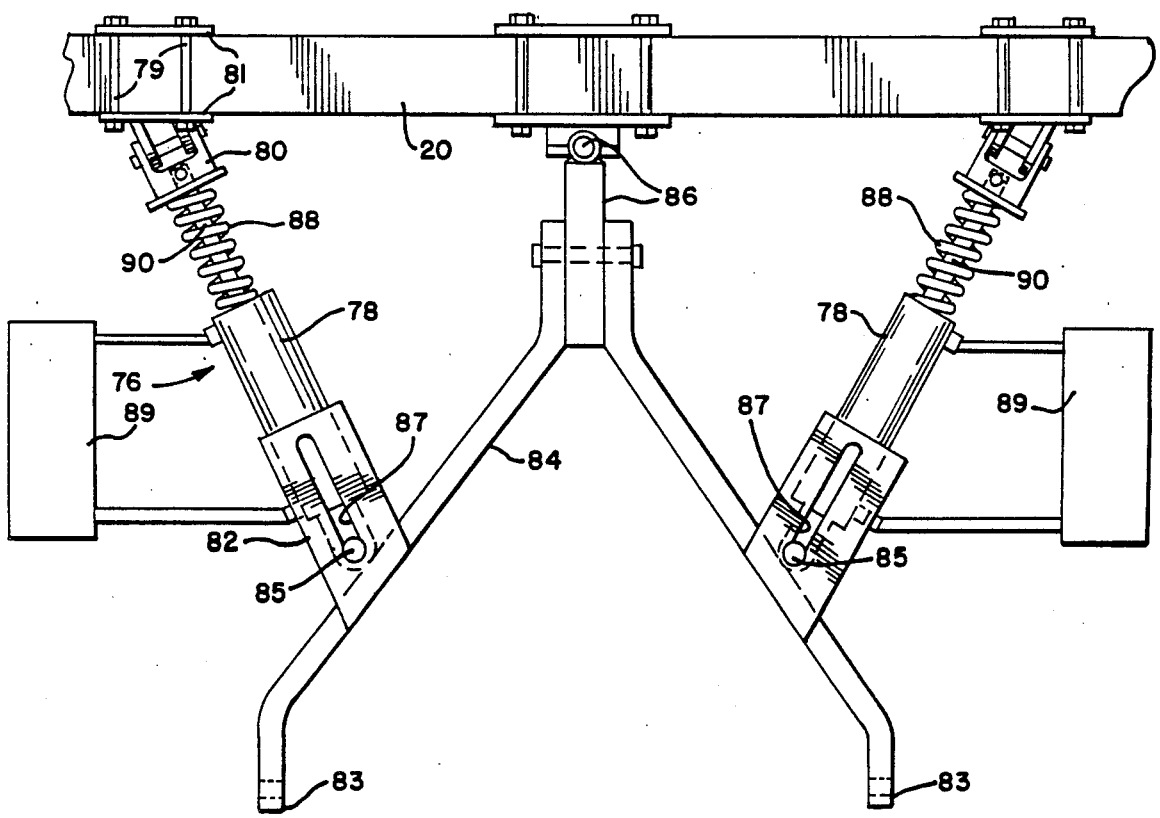
FIG_4_

CENTER PIVOT HITCH ASSEMBLY

TECHNICAL FIELD OF THE INVENTION

The present invention is directed to a mechanism for providing a laterally pivotable connection between a tractor-drawn wheeled farm implement and a wheeled tool bar mounted therebehind. In general, the present invention is directed to a mechanism which provides an articulated or laterally-pivotable joint for wheeled implements or laterally-pivotable joint for wheeled implements having multiple wheeled sections so as to prevent side-skidding of wheels of rear sections when forward sections are making a turn. In particular, the present invention is directed to a mechanism which not only allows a wheeled tool bar to pivot laterally (relative to a wheeled farm implement making a turn) but also selectively maintains tool bar disposition relative to the implement in certain situations. Additional advantages gained through use of the present invention are discussed below.

BACKGROUND OF THE INVENTION

Typically, wheeled tool bars are connected to tractor-pulled wheel farm implements by mechanisms which space the tool bar rearwardly of the wheeled implement and generally parallel to the backside thereof. For example, the wheeled implement may be a transportable seed and/or fertilizer storage hopper for supplying seed and/or fertilizer to a pneumatic-transport distribution system. Further, the tool bar may carry a plurality of soil-engaging ground tools which receive the seed and/or fertilizer from the distribution system and deposit the same into the ground in a conventional manner.

In particular, however, only the wheeled implement (i.e. the transportable storage hopper) immediately behind the tractor is free to pivot as the tractor makes a turn. That is, additional wheeled implements which are spaced behind the wheeled storage hopper implement do not pivot laterally relative thereto.

Conventional tool bars, which are typically mounted behind wheeled storage hopper implements, are currently rather elongated and generally carry a plurality of soil-engaging ground tools thereon, for engaging the soil as mentioned above. Further, the conventional tool bar typically includes means for lowering and raising the tool bar relative to the ground, for thereby causing the ground tools to engage the soil or to be spaced above the soil, respectively. Because of the fixed orientation of the tool bar relative to the wheeled implement backside in conventional agricultural implements, the tool bar and cart wheels can be caused to skid uncontrollably in a direction which is transverse to the path of tractor movement as the tractor makes a turn.

For example, as the tractor makes a turn to the left, which causes the tractor-connected end of the wheeled storage hopper implement to pivot relative to the tractor and accordingly be pulled to the left, the fixed relationship of the wheeled tool bar relative to the wheeled storage hopper implement backside causes the storage hopper implement wheels to uncontrollably side skid to the left and the tool bar wheels to side skid either to the right or to the left depending on whether the ground tools are raised or lowered, respectively. Side skidding of the cart and tool bar wheels usually causes undesirable ruts to form in the field transverse to the path of tractor movement. When the ground tools have been lowered to their above-mentioned soil-engaging (i.e. so-called "working") position, it can be appreciated that the degree of undesired side rutting is even greater. For example, as the tractor moves through the field, the plurality of soil-engaging ground tools are used to form a like plurality of spaced apart furrows in the soil for planting seed, fertilizing crops, etc. Side rutting is thus undesirable because it interferes with furrow formation. The degree of side rutting may even be great enough to destroy freshly planted seed and/or render ineffective (i.e. because the depth below the soil has been altered) freshly deposited fertilizer.

Simply providing the tool bar with a conventional pivotal connection which permits lateral pivoting of the tool bar relative to the wheeled implement backside as the tractor causes the wheeled storage hopper implement to move through a turn introduces other problems, however. That is, while initially solving the above-mentioned tool-bar and cart side-skidding problem, the conventionally pivotable connection introduces other side-skidding problems and a number of problems of other sorts. For example, the conventional laterally pivotable connection allows the tool bar to sway transverse to the path of movement whenever the tool bar wheels are not precisely lined up behind the implement wheels. Further, conventional laterally pivotable connections unduely complicate backup of the wheeled implement when the wheeled tool bar is connected thereto. Operation on steep hillsides further causes complications when the tool bar drifts sideways relative to movement of the wheeled storage hopper implement or so-called "cart" and/or tractor.

SUMMARY OF THE INVENTION

The mechanism of the present invention is preferably carried by a wheeled tool bar and a wheeled agricultural implement such as the above-mentioned so-called "cart". The cart is typically moved along a path by a tractor as above described. The mechanism of the present invention pivotally connects the wheeled tool bar to the backside of the cart. The mechanism of the present invention comprises a center pivot hitch assembly and a stabilization assembly. The center pivot hitch assembly allows the wheeled tool bar to pivot transversely in relation to the path along which the wheeled agricultural implement is being moved (such as by a tractor), as the wheeled implement is thus moved therealong. The stabilization assembly includes hydraulic fluid actuator means for hydraulically dampening and selectively locking and maintaining tool bar disposition relative to the agricultural implement backside, when the wheeled tool bar is oriented substantially parallel to the backside of the wheeled agricultural implement. An additional feature of the present invention, which causes overhung load on the wheeled tool bar to be centered substantially along the axle of the wheeled agricultural implement when the tool bar is raised relative to the ground, will be discussed below.

BRIEF DESCRIPTION OF THE DRAWINGS

FIG. 3 is similar to the view of FIG. 2, illustrating how the mechanism of the present invention allows the wheeled tool bar to pivot laterally relative to the wheeled agricultural implement;

FIG. 4 is a partially fragmented plan view of another embodiment of the present invention;

DETAILED DESCRIPTION OF PREFERRED EMBODIMENTS

Figure 1:
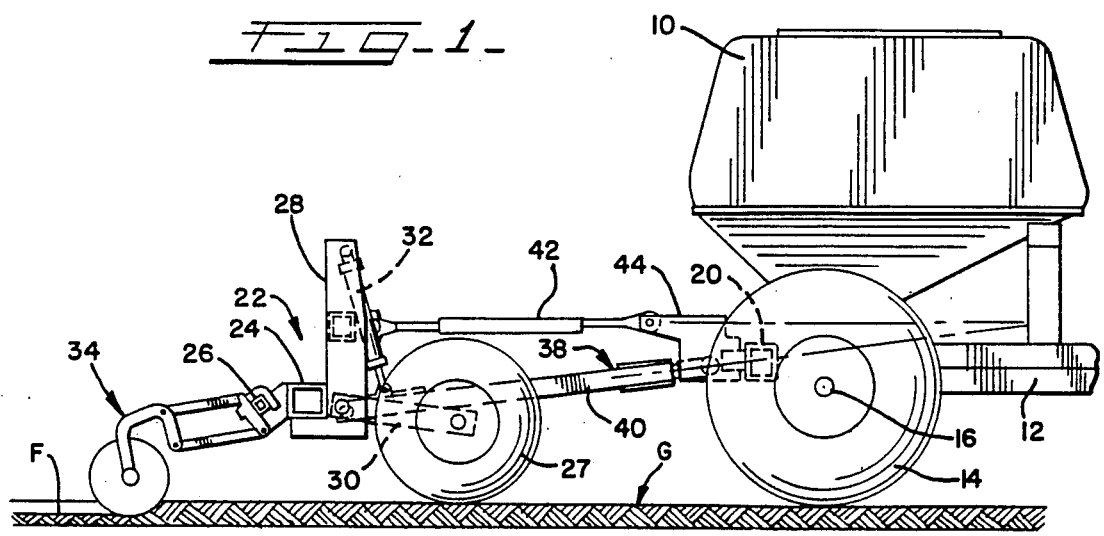
FIG. 1 is a side elevational view of a wheeled cart and a wheeled tool bar connected together by the center pivot hitch assembly of the present invention.

While the present invention is susceptible to embodiment in various forms, there is shown in the drawings and hereinafter described in detail a number of presently preferred embodiments of the present invention, with the understanding that the present disclosure is to be considered as an exemplification of the invention without limitation to the specific embodiments illustrated.

Referring initially to FIG. 1, there is shown a transportable storage hopper or so-called "cart" 10 pivotally connected to a tractor (not shown) by an elongated hitch bar 12. The cart 10 is transported across the ground G by a pair of spaced wheels 14 rotatably mounted on opposite end portions of an axle 16 fixed to the underside of cart 10.

Figure 2:
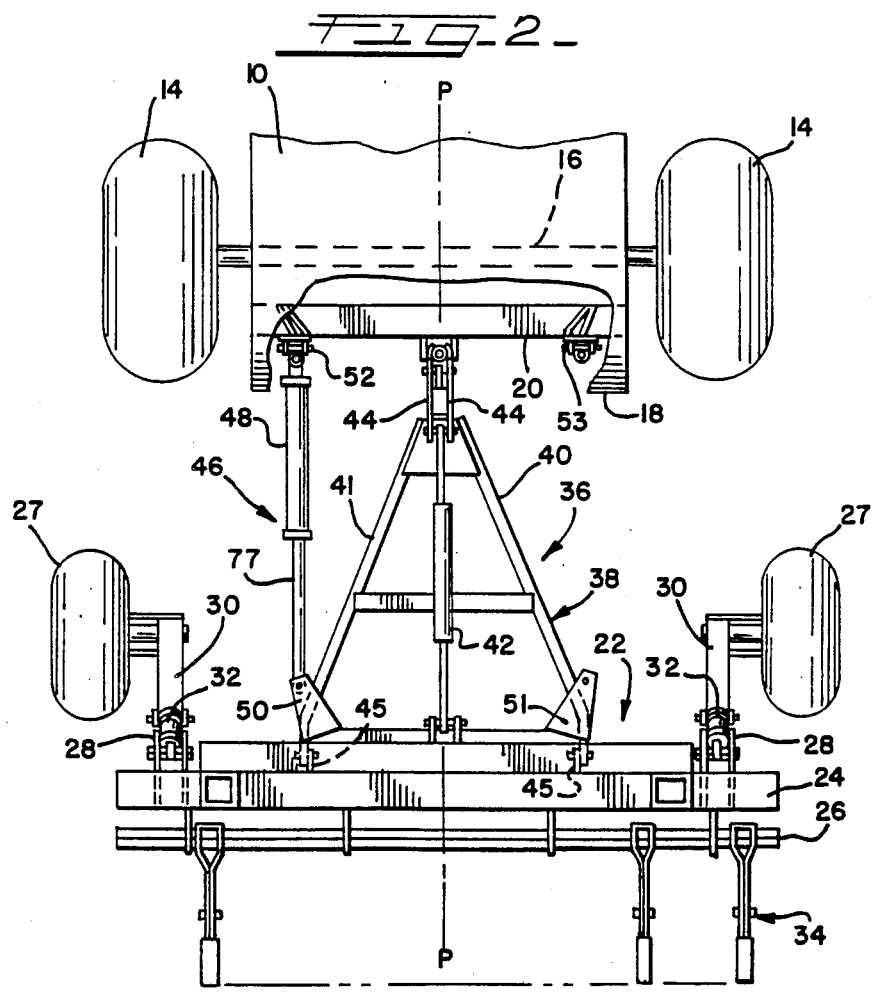
FIG. 2 is a partially broken away top plan view of the assembly shown in FIG. 1, further including one embodiment of the stabilization assembly portion of the present invention.

Connected to a backside 18 of the wheeled agricultural implement 10, along a frame 20 thereof, is an elongated tool bar assembly 22 comprising a primary tool bar 24 and a secondary tool bar 26 (FIG. 2). The tool bar assembly 22 is transported across the ground G by a pair of spaced wheels 27 pivotally connected to opposite end portions of the tool bar assembly 22.

The tool bar assembly 22 is raiseable and lowerable relative to the ground G. Each tool-bar assembly wheel 27 is pivotally connected to a respective end portion of the tool bar assembly 22 as follows.

A pair of upstanding cylinder towers 28 (FIGS. 1 and 6) are fixed to respective opposite end portions of the primary tool bar 24. Each wheel 27 is pivotally connected to a respective cylinder tower 28 by an associated wheel arm 30, for raising and lowering the tool bar assembly 22 relative to the ground G, as follows. Each arm 30 is pivotally connected at a first end portion thereof to a lower portion of an associated respective one of the cylinder towers 28. Rotatably mounted on the opposite end portion of each respective one of the arms 30 is an associated respective one of the wheels 27 (FIGS. 1 and 3). Pivotally connecting an upper portion of one of the pair of cylinder towers 28 to an intermediate portion of a respective one of the pair of wheel arms 30 (which is pivotally connected thereto) is an extendable (FIG. 6) and retractable (FIG. 1) hydraulic fluid actuator 32.

Briefly, simultaneous extension of the pair of actuators 32 raises the tool bar assembly 22 relative to the ground G (FIG. 6); and simultaneous retraction of the hydraulic fluid actuators 32 lowers the tool bar assembly 22 to the ground. The raised or so-called "transport" position (FIG. 6) is used to transport the tool bar assembly 22 across the ground G; and the lowered or so-called "working" position (FIG. 1) is used to cause a soil-engaging ground tool 34 to form a furrow F, as mentioned above. A plurality of spaced ground tools 34 are preferably mounted on the secondary tool bar 26 at suitably spaced positions (FIGS. 2 and 3). It can thus be appreciated that a sizeable overhung load can thus be imposed upon cart wheels 14 by weight of the assembly 22 and the weight of the ground tools 34 mounted thereon.

Figure 6:
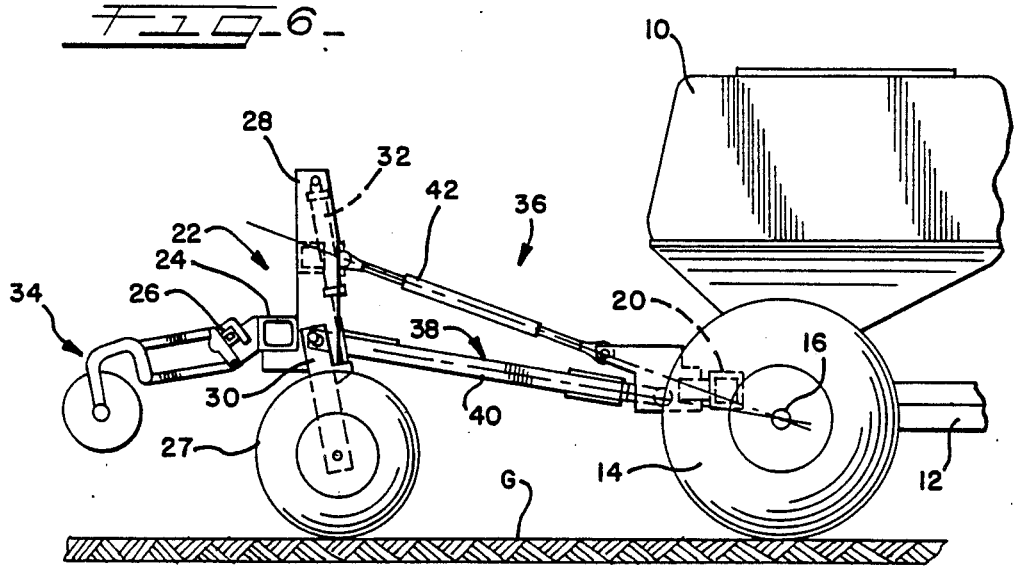
FIG. 6 is similar to the view of FIG. 1, showing soil-engaging ground tools raised above the ground (as compared to FIG. 1), for illustrating that feature of the present invention which centers overhung load substantially along the axle of the wheeled implement when the ground tools are raised above the ground, in the so-called "transport" position, as shown.

The center pivot hitch assembly portion of the present invention will now be discussed. The center pivot hitch assembly 36 (FIGS. 2 and 4) allows the tool bar assembly 22 to pivot transverse to a path P—P of cart movement (FIG. 2), when the cart 10 is caused to move along the path P—P and to turn (FIG. 3). The center pivot hitch assembly 36 comprises an A-shaped frame 38 pivotally connecting the tool bar assembly 22 to the cart backside 18. In particular, the A-shaped frame 38, including lower linking members 40 and 41, and an upper linking member 42, pivotally connects the tool bar assembly 22 to the cart frame 20. That is, the frame 38 and upper linking member 42 are each independently pivotally connected, at the cart end portions thereof, to hitch plates 44 (FIGS. 1 and 2), whereby the frame 38 and upper linking member 42 are pivotable relative to the horizontal (FIGS. 1 and 6). The hitch plates 44, furthermore, are laterally pivotally connected to the cart frame 20 to permit the tool bar assembly 22 to pivot transverse to the path P—P as the cart 10 makes a turn (FIGS. 2 and 3). Thus, hitch plates 44 carry conventional elements which provide a universal joint for connecting center pivot hitch assembly 36 to cart frame 20. Pivot hitch assembly 36 is pivotally connected to tool bar assembly 22 at mounting plates 45, which are fixed to primary tool bar 24 (FIGS. 2 and 3).

The stabilization assembly portion of the present invention will now be discussed. One embodiment of the stabilization assembly 46 (FIGS. 2 and 3) comprises a double-acting hydraulic fluid actuator 48 shown at mid-stroke in FIG. 2, and retracted in FIG. 3. Actuator 48 is pivotally connected to the tool bar assembly 22 at mounting plates 50. The illustrated plates 50 are fixed to primary tool bar 24 in a conventional manner.

The opposite end portion of the hydraulic fluid actuator 48 is pivotally connected to the cart frame 20 by universal joint 52 (FIGS. 2, 3 and 5), whereby the hydraulic fluid actuator 48 is both pivotable relative to the horizontal and laterally pivotable relative to the direction of travel of the cart 10. (The hydraulic fluid actuator 48 and associated pivoted connections have been removed from FIGS. 1 and 6 for the sake of clarity.)

Figure 5:
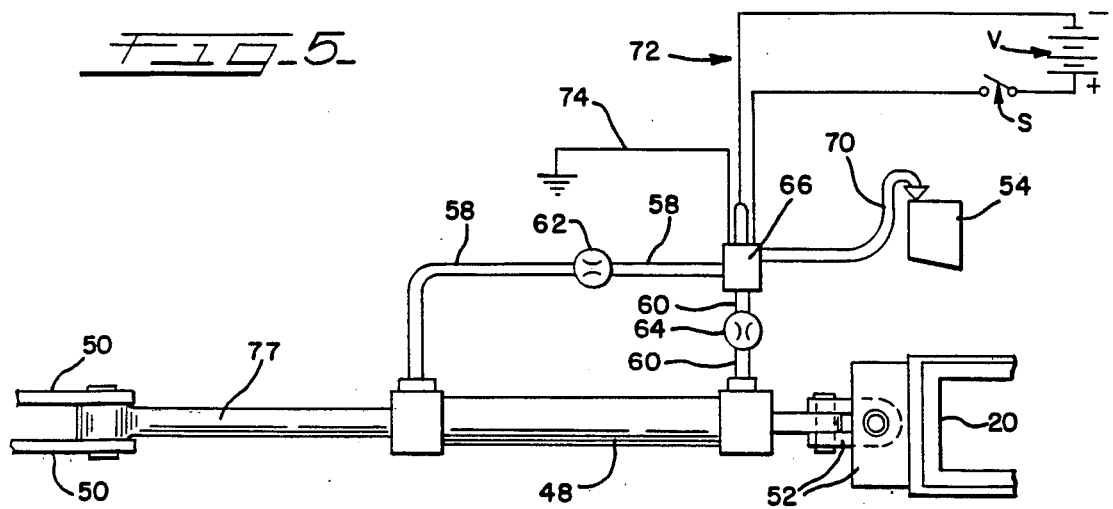
FIG. 5 is a diagrammatic view illustrating a preferred method of operating the above-mentioned stabilization assembly portion of the present invention.

Reference is next invited to FIG. 5, and preferred operation of the hydraulic fluid actuator 48 of the stabilization assembly portion of the present invention will now be discussed. In particular, this stabilization feature prevents lateral swerving of the tool bar assembly 22 when assembly 22 is in the transport position and cart 10 is traveling at a relatively high transport speed, e.g. 15 miles per hour or greater.

Hydraulic fluid from a source 54 (i.e., the fluid reservior or tank) is supplied to hydraulic fluid actuator 48 via conduit 58 or 60. Each of the conduits 58 (and 60) preferably includes a respective orifice 62 (and 64) for restricting flow of hydraulic fluid to and from the actuator 48. Briefly, flow-restricting the orifices 62 and 64 permit the actuator 48 to hydraulically dampen the movement of tool bar assembly 22 relative to cart 10 such as during "roading" or transport of the assembly, thus desirably abating and stabilizing side sway of the tool bar assembly.

A commercially-available multi-ported solenoid-operated flow-control valve 66 receives hydraulic fluid from source or tank 54 via a conduit 70, for supplying hydraulic fluid to the actuator 48 via conduit 58 or 60 as flow is induced by pressure differentials attendant to movement of the actuator. From fluid actuator 48, excess hydraulic fluid (passing through solenoid valve 66) is returned to hydraulic fluid source 54 via conduit 70.

A suitable circuit 72 for controlling operation of the solenoid valve 66 may comprise a D-C voltage source V, and a master switch S for selectively operating the solenoid-operated valve 66, as desired. Preferably, the solenoid valve 66 is grounded, as shown by grounded connection 74. In the illustrated embodiment, the switch S is preferably operated from the tractor cab (not shown).

In operation, a tractor operator first energizes circuit 72 by closing switch S, thereby operating valve 66 to block flow between the opposite ends of actuator 48, thereby permitting the actuator to act as a rigid or solid elongated connecting or linking member for controlling disposition of tool bar assembly 22 relative to the cart backside 18. As noted, rigidly maintaining the disposition of the tool bar in this manner facilitates backing-up of the cart and tool bar, and operation on steeply sloping terrain.

In the transport position (FIG. 6), the tool bar assembly 22 is preferably disposed generally parallel to the cart frame 20 (FIG. 2), but is preferably allowed to pivot, with such relative pivoting movement being hydraulically dampened and stabilized by actuator 48. To allow the center pivot hitch assembly 36 to laterally pivot relative to the cart 10, such as when negotiating a curve, the operator opens valve 66 to allow hydraulic fluid to flow into and from hydraulic fluid actuator 48. The preferred provision of orifices 62 and 64 thus act to restrict flow whereby extension and retraction of actuator 48 is hydraulically dampened. Accordingly, pivotal movement of tool bar assembly 22 relative to cart 10 is likewise hydraulically dampened, thus desirably stabilizing pivotal movement of the tool bar assembly.

Although not shown, another similarly-controlled hydraulic fluid actuator connecting the center pivot hitch assembly 36 to the cart frame 20 can be added to the illustrated embodiment, to pivotally connect mounting plates 51 to universal joint 53 (FIG. 2), according to the principles of the present invention, if desired.

Referring now to FIG. 4, a second embodiment 76 of the present stabilization assembly will now briefly be discussed. The stabilization assembly 76 includes a pair of hydraulic fluid actuators 78, each pivotally connected at one end portion thereof, by a conventional universal joint 80, to the cart frame 20. Universal joint 80 can be removably and longitudinally-adjustably mounted on frame 20 in a conventional manner using a pair of spaced-apart plates 81 and threaded fasteners 79.

The other end of each hydraulic fluid actuator 78 is pivotally connected to slotted plate 82 which itself is fixed to frame 84. The frame 84 is generally Y-shaped, and is another embodiment of the A-shaped frame 38 shown in FIGS. 2 and 3. That is, the spaced-apart end portions 83 of the Y-shaped frame 84 (FIG. 4) are each pivotally connected to a respective one of the pair of spaced-apart mounting plates 45 (FIGS. 2 and 3), mentioned above in connection with the center pivot hitch assembly 36. Further, universal joint 86, connecting the Y-shaped frame 84 to cart frame 20, is a mechanical equivalent of universal joint 52 shown in FIG. 5.

Actuators 48 may be single-acting or double-acting for effecting the desired selective locking and stabilization of the tool bar relative to the cart. In the illustrated embodiment, double-acting actuators are shown, with respective hydraulic circuits 89 provided for selectively blocking flow between opposite ends of each actuator; a solenoid-operated valve such as 66 may be employed in each such circuit, with a suitable accumulator provided for excess fluid.

Further, hydraulic dampening and stabilization can be effected by the provision of compression springs 88 on the piston rods 90 of the actuators; however, it will be appreciated that the flow-restricting orifices, as in the previously-described embodiment, may alternately be employed. Whether springs 88 or orifices are used to effect dampening, the desired stabilization can be achieved. The use of springs 88 provides a self-centering action for the hitch assembly relative to the tool bar. The provision of slotted connections for each actuator permits sufficient relative pivotal movement of the tool bar relative to the cart to readily negotiate curves of the desired minimum radius. Closing of the valves within the circuits 89 acts to block flow to and from the actuators 78, thus acting to rigidify the pivotal connection between the tool bar and cart to facilitate backing-up and operation on sloping terrain, as in the previous embodiment.

Initially, each one of the illustrated pivot pins 85, shown pivotally connecting a respective one of the pair of actuators 78 to a respective one of the spaced-apart plates 82 at slot 87, abuttingly engages a respective end portion of the slot 87 with which it is associated. By design, this causes the tool bar assembly 22 to be disposed parallel to frame 20.

Lastly, a feature of the present invention which centers overhung load carried by the tool bar assembly 22 substantially along the cart axle 16 will now be discussed. Referring initially to FIG. 1, it will be noted that when the tool bar assembly 22 is lowered to the "working" position, the extended lines of action of upper and lower linking members 42 and 40, respectively, intersect forward of, and spaced above, the cart wheels 14. However, the center pivot hitch assembly of the present invention has been specifically designed such that when the tool bar assembly 22 is raised relative to the ground G to the "transport" position (FIG. 6), the extended lines of action of the upper and lower linking members 42 and 40, respectively, substantially intersect along the implement axle 16. This feature of the present invention, of course, substantially eliminates so-called "negative hitch weight" at the connection where the hitch bar 12 is connected to the tractor (not shown). That is, "negative hitch weight" is the tendency of the hitch bar 12 to impose a vertical force where it is connected to the tractor. Negative hitch weight is a common problem experienced with commercially available agricultural implements of the type discussed herein. A commonly experienced result of negative hitch weight is that the tractor-connected end of hitch bar 12 may be so great as to cause the tractor-end of hitch bar 12 to be lifted off the ground when hitch bar 12 is disconnected from the tractor. This, of course, is undesirable.

What has been illustrated and described herein is a novel center pivot hitch assembly having selected features that provide certain advantages. For example, the assembly of the present invention provides a lock-out feature to lock rigid an articulated joint between a wheeled cart and a wheeled tool bar, to thereby allow a tractor operator to backup the cart and tool bar. The lock-out feature also allows a tractor operator to operate on relatively steep hillsides, where a pivotable but non-lockable tool bar would otherwise swerve and drift sideways (i.e. lateral to a path along which the cart and tool bar are moved). The center pivot hitch assembly of the present invention also provides a stability feature (discussed above) between the cart and the tool bar, when the tool bar is in the "transport" mode. That is, the present invention precludes the tool bar from swerving transverse to the direction of cart travel at transport speeds.

Further, the present invention substantially reduces side loading on ground tools, with the tool bar assembly 22 lowered to the working position (FIG. 1), when turning (FIG. 3).

While the novel center pivot hitch assembly of the present invention has been illustrated and described with reference to preferred embodiments, the present invention is not limited thereto. On the contrary, alternatives, changes or modifications may become apparent to those skilled in the art upon reading the foregoing description. Accordingly, such alternatives, changes and modifications are to be considered as forming a part of the invention insofar as they fall within the spirit and scope of the appended claims.

What is claimed is:

1. An agricultural implement hitch assembly and stabilization arrangement, comprising:
   a tool bar adapted to receive associated ground-working tools, said tool bar being provided with means for effecting vertical movement of the tool bar between raised and lowered positions;
   a wheeled implement including a pair of laterally spaced wheels defining a transverse wheel axis;
   frame means rigidly connected to and extending forwardly of said tool bar;
   means pivotally connecting a forward end portion of said frame means to a backside of said wheeled implement whereby said tool bar is laterally pivotable relative to said wheeled implement, said frame means including first lower linking means and second upper linking means arranged in non-parallel relation, said second upper linking means being positioned to direct an overhung load created on said tool bar in said raised position thereof substantially along said transverse axis of said sheeled implement; and
   hydraulic stabilization means extending between and connected with said wheeled implement and said frame means, said stabilization means comprising extensible hydraulic fluid actuator means, and means for controlling fluid flow into and from said actuator means for selectively (1) fixing the effective length of said actuator means to maintain said tool bar in a fixed, generally perpendicular disposition relative to the longitudinal axis of said wheeled implement, and (2) controlling said actuator means to stabilize movement of said tool bar relative to said wheeled implement;
   wherein in said raised position of said tool bar, said upper and lower linking means of said frame means are arranged in forwardly converging relation to each other, with the upper and lower linking means respectively defining lines of action which intersect generally at said transverse wheel axis of said wheeled implement.

2. An agricultural implement hitch assembly and stabilization arrangement, comprising:
   an elongated tool bar adapted to receive associated ground-working tools, said tool bar being provided with means for vertically moving the tool bar between raised and lowered positions;
   a wheeled implement having a pair of laterally spaced wheels defining a transverse wheel axis;
   frame means connected to said tool bar and extending forwardly thereof, said frame means including upper and lower linking means arranged in non-parallel, forwardly converging relation to each other, said upper linking means being oriented to direct an overhung load substantially along said transverse wheel axis of said implement;
   universal means for connecting a forward end portion of said frame means to the backside of said wheeled implement for allowing said frame means to pivot both vertically and laterally relative to said wheeled implement; and
   means for selectively maintaining said tool bar in a substantially parallel disposition to the backside of said wheeled implement;
   wherein in said raised position of said tool bar, said upper and lower linking means of said frame means are arranged in forwardly converging relation to each other, with the upper and lower linking means respectively defining lines of action which intersect generally at said transverse wheel axis of said wheeled implement.

3. The mechanism of claim 2 wherein:
   said means for maintaining comprises hydraulic fluid actuator means pivotally connected at one end portion thereof to the wheeled implement backside and at the other end portion thereof to the tool bar; and
   means for selectively controlling fluid flow into and from said actuator means for selectively locking the tool bar relative to said implement.

* * * * *